Sept. 4, 1928.

H. D. GEYER 1,683,345

ICE CREAM CABINET LID AND METHOD OF MANUFACTURING THE SAME

Filed Sept. 9, 1927

Inventor
Harvey D. Geyer
By Spencer Hardman & Fehr
his Attorneys

Patented Sept. 4, 1928.

1,683,345

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

ICE-CREAM-CABINET LID AND METHOD OF MANUFACTURING THE SAME.

Application filed September 9, 1927. Serial No. 218,553.

This invention relates to molded lids, particularly such as are used for closing the openings in the top of ice cream cabinets provided to afford access to the ice cream cans therebelow.

Applicant's copending application, Serial No. 169,668, filed February 19, 1927, discloses a form of molded lid similar to the present invention but without the outer covering or casing of celluloid which is the feature of the present application.

An object of this invention is to provide a lid of molded bituminous material and having an outer casing of celluloid firmly bonded thereto by being molded in situ upon the molded material. This casing extends around and reinforces the peripheral edge of the molded lid against breakage and provides a smooth, lustrous, lasting, finished upper surface to the lid.

A further object is to provide a simple and efficient method of securing the celluloid casing to the molded material by preforming the celluloid to substantially its final shape and inserting it in the lid mold cavity in contact with the corresponding wall of said mold cavity in such manner that, when the mold cavity is filled with hot plastic material under high pressure, the celluloid casing is forced into tight engagement with the cavity walls and so prevents any of the plastic material from being forced to the outside of said casing. The plastic material is forced up into the central hand knob shell and into the peripheral channel of the celluloid casing, whereby the casing is firmly interlocked with the molded material.

Further objects and advantages of the present invention will be apparent from the following description, reference being had to the accompanying drawing wherein a preferred form of embodiment of the present invention is clearly shown.

In the drawing.

Similar reference characters refer to similar parts throughout the drawing.

Figure 1:
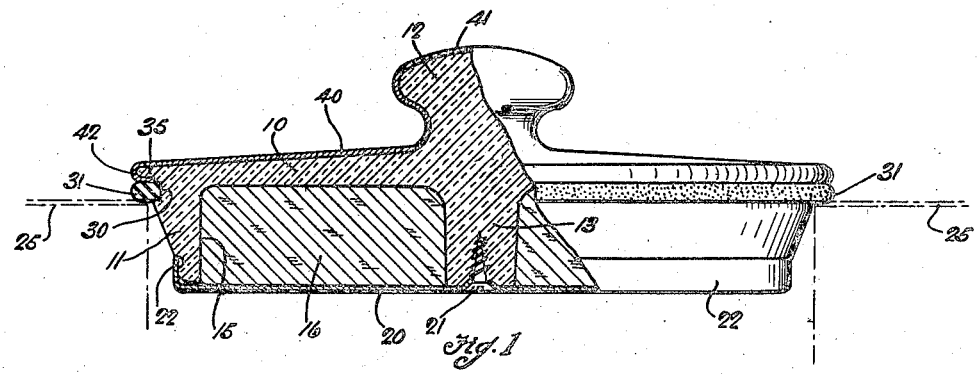
Fig. 1 is in part a side elevation and in part a vertical section through a lid for an ice cream cabinet made according to this invention.

10 designates the molded top member or main body of the lid which has a depending annular flange 11 molded integrally therewith. Also molded integrally therewith is the central hand knob 12 and a central depending projection 13. The interior chamber 15 of member 10 is filled with a suitable heat insulating material 16, such as loose ground cork or cork board, and the sheet metal bottom plate 20 is held fixed in place by the central screw 21 and by the marginal up-turned flange 22 which telescopes tightly upon the lower end of the molded flange 11.

A gasket channel groove 30 is molded in member 10 in the position clearly shown in Fig. 1 immediately under the radially projecting peripheral flange 35. An endless soft rubber gasket 31 fits snugly within the groove 30 and its projecting portion is backed up at its top side by the flange 35. The weight of the lid is supported by the gasket 31 resting upon the cabinet top 25 (shown in dot and dash lines) at the edge of the hole into which the lid fits. It is thus seen that the weight of the lid is sustained by the peripheral flange 35 which overlies the soft rubber gasket 31.

The parts so far described are fully disclosed in applicant's above-mentioned prior application. The novel feature of the present invention is the outer casing 40 of sheet celluloid which is firmly bonded to the molded material and forms a hard finished smooth, lustrous upper surface for the lid. The term "celluloid" as used hereinafter is intended to include all similar nitrocellulose compounds having the general characteristics of celluloid but marketed under various trade names.

The method of making the lid with the celluloid casing 40 will now be described. First a sheet of celluloid of sufficient thickness to withstand considerable drawing is softened by well known means and preformed by means of suitable dies approximately to the shape shown in Fig. 1. This preformed casing 40 is then placed within the cavity of the die mold in which the plastic bituminous material is to be molded to form the body 10. This mold is divided along a diametrical line both to permit the proper insertion of the preformed casing 40 and to permit the later removal of the molded member 10 from the mold. The hot plastic bituminous material is forced into the mold under a very high pressure by a hydraulic plunger which closes the open side of the mold cavity, the end of the plunger forming the interior chamber 15 with the central projection 13 therein, all as will be readily understood by those skilled in this art. The hot plastic bituminous material will be forced by the hydraulic plunger with a high pressure against the preformed celluloid casing and cause it to exactly conform with and hug the walls of the mold cavity. The plastic material will be forced up into the central hand knob casing 41 and into the U-shaped peripheral channel 42 of the casing 40 to form the flange 35. It will be obvious that the casing 40 will thus be firmly interlocked with the molded material both at its central portion and around its periphery.

The plastic bituminous composition used for molding the member 10 preferably consists of the following materials and proportions by weight: Gilsonite (Utah asphalt) 46%; korite (a bituminous residue of low melting point derived as a by-product of petroleum refining and extensively marketed by the Standard Oil Company of Indiana) 11½%; disintegrated asbestos fiber 19½%; and an inert filler such as powered slate, fine clay, etc., 23%. These materials are converted into a substantially homogeneous plastic doughy mass in a heated kneading machine at a temperature around 385° F., and then the proper amount of this hot material is put into the unheated lid mold after the celluloid casing 40 is inserted therein, and the hydraulic plunger operated to form the lid as above described. The internal pressure in the material preferably exceeds 3500 lbs. per square inch. The pressure remains on for several minutes, during which time the plastic material becomes hard and non-shrinking when removed from the mold. The molded lid can then be removed from the mold and permitted to cool down to room temperature. This cold molding material and method of molding is described in greater detail and claimed in my prior application, Serial No. 169,669, filed February 19, 1927.

Figure 2:
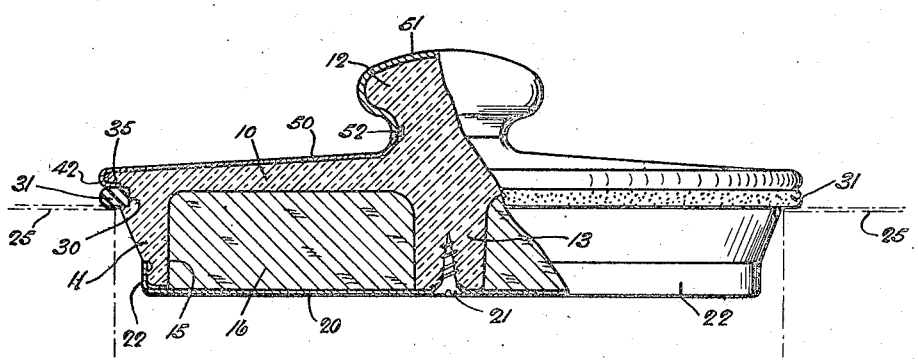
Fig. 2 is a view similar to Fig. 1 but shows a modified form.

The modification shown in Fig. 2 differs from that of Fig. 1 in that the hand knob casing 51 is preformed from a separate and heavier sheet of celluloid than the remaining portion 50 of the preformed casing. Both of these preformed portions 50 and 51 are set within the lid mold, overlapping slightly at the neck of the knob. The heat and high pressure under which the bituminous material is molded will form a neat overlap joint between the two portions 50 and 51, as shown at 52 in Fig. 2.

While the form of embodiment of the present invention as herein disclosed, constitutes a preferred form, it is to be understood that other forms might be adopted, all coming within the scope of the claims which follow.

What is claimed is as follows:

1. A removable lid for a container comprising: a main body member molded to shape from a bituminous plastic composition and having an outer celluloid casing molded in situ and interlocked with the molded material around the periphery of the lid.

2. A removable lid for a container comprising: a main body member of molded bituminous composition having a central hand knob integral therewith, and an outer casing of celluloid molded in situ and firmly secured to the molded material at the center by the interlock with the hand knob.

3. A removable lid for an ice cream cabinet comprising: a molded composition top member having a projecting peripheral flange adapted to rest upon the container, a sheet celluloid upper casing molded in situ upon said top member and extending around and encasing said peripheral flange.

4. The method of securing an outer sheet celluloid casing to a lid of molded plastic material comprising: preforming the sheet celluloid by suitable dies approximately to the final form of the casing, placing this preformed casing in contact with the corresponding cavity wall within the mold cavity for the lid, and then forcing hot plastic material into the mold cavity with a high pressure and maintaining said pressure until the plastic material sets.

In testimony whereof I hereto affix my signature.

HARVEY D. GEYER.